(12) United States Patent
Kimura et al.

(10) Patent No.: US 7,742,872 B2
(45) Date of Patent: Jun. 22, 2010

(54) ON-VEHICLE NAVIGATION APPARATUS, TURNOFF ROAD GUIDING METHOD, DRIVING LANE SPECIFYING DEVICE, AND DRIVING LANE SPECIFYING METHOD

(75) Inventors: Makoto Kimura, Sagamihara (JP); Kenjiro Nakano, Novi, MI (US)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 1381 days.

(21) Appl. No.: 11/146,289

(22) Filed: Jun. 7, 2005

(65) Prior Publication Data
US 2006/0031008 A1 Feb. 9, 2006

(30) Foreign Application Priority Data

Jun. 7, 2004 (JP) ............................ P2004-168422
Apr. 22, 2005 (JP) ............................ P2005-124615

(51) Int. Cl.
G01C 21/00 (2006.01)
(52) U.S. Cl. ........................................ 701/208; 340/990
(58) Field of Classification Search ......... 701/207–211, 701/117; 340/988, 990, 995; 73/178 R
See application file for complete search history.

(56) References Cited

U.S. PATENT DOCUMENTS 5,765,116 A    6/1998  Wilson-Jones et al.
6,032,098 A *  2/2000  Takahashi et al. ........... 701/210
6,269,304 B1 * 7/2001  Kaji et al. .................. 701/209
6,577,334 B1   6/2003  Kawai et al.
2003/0156015 A1 8/2003  Weinner

FOREIGN PATENT DOCUMENTS

DE          10327869         1/2005
EP        0 580 105 A1       1/1994
JP         08-313291        11/1996
JP         2003-247839       9/2003
WO       WO 2004/111574     12/2004

OTHER PUBLICATIONS

Chinese Office Action dated Mar. 7, 2008 with English Translation.

* cited by examiner

*Primary Examiner*—Dalena Tran
(74) *Attorney, Agent, or Firm*—McDermott Will & Emery LLP (57) ABSTRACT

An on-vehicle navigation apparatus 50 includes a current location calculator 21 calculating a current location of an own vehicle, a map information database 2 storing map information including road map data, a driving lane specifying section 23 detecting a lane change in response to an operation signal from a winker and specifying a driving lane of the own vehicle, and a guidance-timing controller 24 detecting a turnoff road ahead of the own vehicle in a traveling direction and conducting turnoff road guidance on a driver at a forward position distanced from the detected turnoff road depending on a location of the specified driving lane of the own vehicle.

9 Claims, 5 Drawing Sheets

| VEHICLE SPEED (km/h) JAM-UP STATUS | ~20 | ~40 | ~60 | ~80 | ~100 | ~120 | ~140 |
|---|---|---|---|---|---|---|---|
| A | 500 | 700 | 800 | 900 | 1000 | 1100 | 1200 |
| B | 700 | 800 | 900 | 1000 | 1100 | 1200 | 1300 |
| C | 800 | 900 | 1000 | 1100 | 1200 | 1300 | 1400 |
| D | 900 | 1000 | 1100 | 1200 | 1300 | 1400 | 1600 | m

| JAM-UP STATUS \ VEHICLE SPEED (km/h) | ~20 | ~40 | ~60 | ~80 | ~100 | ~120 | ~140 | m |
|---|---|---|---|---|---|---|---|---|
| A | 500 | 700 | 800 | 900 | 1000 | 1100 | 1200 | |
| B | 700 | 800 | 900 | 1000 | 1100 | 1200 | 1300 | |
| C | 800 | 900 | 1000 | 1100 | 1200 | 1300 | 1400 | |
| D | 900 | 1000 | 1100 | 1200 | 1300 | 1400 | 1600 | |

FIG. 3B

| JAM-UP STATUS \ VEHICLE SPEED (km/h) | ~20 | ~40 | ~60 | ~80 | ~100 | ~120 | ~140 | m |
|---|---|---|---|---|---|---|---|---|
| A | 1500 | 1700 | 1800 | 1900 | 2000 | 2100 | 2200 | |
| B | 1700 | 1800 | 1900 | 2000 | 2100 | 2200 | 2300 | |
| C | 1800 | 1900 | 2000 | 2100 | 2200 | 2300 | 2400 | |
| D | 1900 | 2000 | 2100 | 2200 | 2300 | 2400 | 2600 | |

FIG. 4

FIG. 5

ON-VEHICLE NAVIGATION APPARATUS, TURNOFF ROAD GUIDING METHOD, DRIVING LANE SPECIFYING DEVICE, AND DRIVING LANE SPECIFYING METHOD

BACKGROUND OF THE INVENTION

The present invention relates to an on-vehicle navigation apparatus, a turnoff road guiding method, a driving lane-specifying device, and a driving lane specifying method.

An on-vehicle navigation apparatus, disclosed in Japanese Patent No. 3161280, is configured such that in order to enhance a safety of in driving during a lane change, a current location, inclusive of a driving lane, of an own vehicle is specified based on road information acquired from a Differential Positioning System (D-GPS) serving as a satellite positioning sensor, a vehicle speed sensor, a direction sensor and road map data stored in a map information database.

Such an apparatus is operative to receive correction data through FM broadcasting based on a positioning error calculated in a D-GPS standard station that receives radio waves from a GPS satellite.

SUMMARY OF THE INVENTION

However, due to limitations in an available utilization area of the D-GPS, it was hard to accurately estimate a route to a driving lane in certain places. Particularly, it was hard to properly conduct drop-off guidance depending on a driving lane during an approach to an exit of a highway.

It is therefore an object of the present invention to provide a driving lane specifying device, a driving lane specifying method, which are able to accurately estimate a route to a driving lane for an own vehicle with no need for a D-GPS, and an on-vehicle navigation apparatus and a turnoff road guiding method for conducting a turnoff road guidance based on the specified position of a driving lane of the own vehicle.

A first aspect of the present invention provides an on-vehicle navigation apparatus comprising a current location calculator calculating a current location of an own vehicle, a map information database storing map information including road map data, a driving lane specifying section detecting a lane change in response to an operation signal from a winker and specifying a driving lane on which the own vehicle is traveling, and a guidance timing controller detecting a turnoff road ahead of the own vehicle in a traveling direction based on the current location of the own vehicle and the road map data, and conducting a turnoff road guidance on a driver at a forward position in front of the detected turnoff road, with a given distance from the forward position, depending on a location of the specified driving lane of the own vehicle.

A second aspect of the present invention provides a turnoff road guiding method comprising calculating a current location of an own vehicle, detecting a lane change in response to an operation signal from a winker and specifying a driving lane on which the own vehicle is traveling, detecting a turnoff road ahead of the own vehicle in a traveling direction based on the current location of the own vehicle and a road map data, and conducting a turnoff road guidance on a driver at a forward position in front of the detected turnoff road, with a given distance from the forward position, depending on a location of the specified driving lane of the own vehicle.

A third aspect of the present invention provides a driving lane specifying device comprising a driving lane specifying section detecting a lane change in response to an operation signal from a winker and specifying a driving lane on which an own vehicle is traveling.

A fourth aspect of the present invention provides a method of specifying a driving lane, comprising detecting an operation signal from a winker, discriminating a lane change in response to a crossing signal indicative of whether an own vehicle straddles a white line rightward or leftward, and specifying a location of a driving lane on which the own vehicle is currently traveling.

DETAILED DESCRIPTION OF THE PREFERRED EMBODIMENTS

Hereunder, an on-vehicle navigation apparatus according to the present invention is described below with reference to an example of an embodiment.

Figure 1:
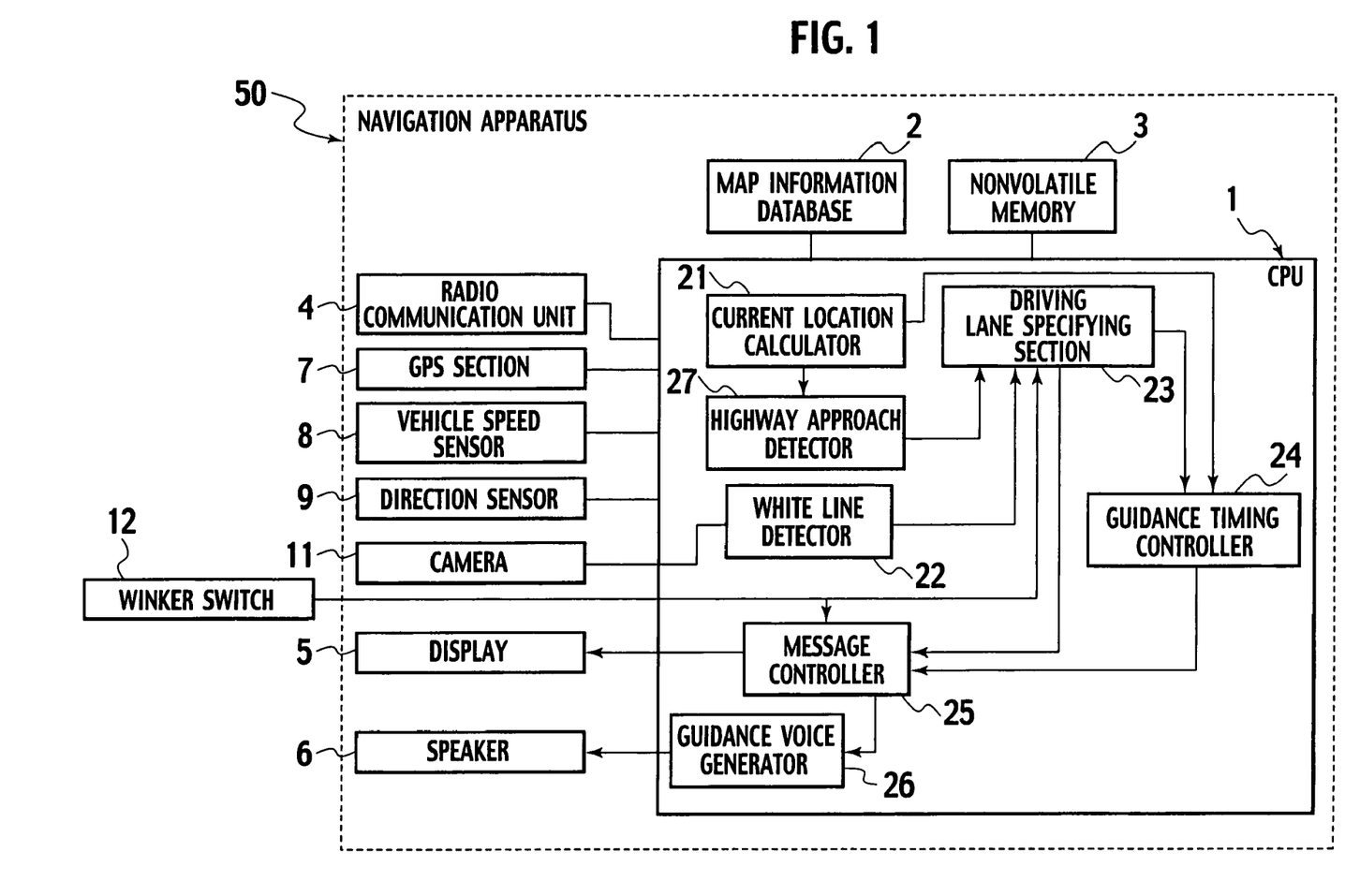
FIG. 1 is a structural block diagram of an on-vehicle navigation apparatus of one embodiment according to the present invention.

The navigation apparatus 50, shown in FIG. 1, is comprised of a central processing unit (CPU) 1, a map information database 2 to which the CPU 1 is connected, a nonvolatile memory 3, a radio communication unit 4, a display 5, a speaker 6, a GPS section 7 for positioning upon receipt of radio waves delivered from a GPS satellite, a vehicle speed sensor 8 for detecting a vehicle speed, a direction sensor 9 for detecting a direction in which a vehicle is running, and a winker switch 12 for permitting a winker operation signal (indicative of a right winker being turned on or a left winker being turned on), effectuated by a user, to be delivered to the CPU 1.

The CPU 1 serves to control the navigation apparatus 50 as a whole and includes a current location calculator 21, a white line detector 22, a driving lane specifying section 23, a guidance-timing controller 24, a message controller 25, a guidance voice generator 26 and a highway approach detector 27.

Further, the CPU 1 is also connected to an input section (not shown). The input section includes a variety of button switches for use in retrieving and setting a destination, retrieving and setting a route to the destination, altering a contraction scale of a map, displaying a menu screen and selecting items on the menu screen.

The display 5 serves to display information such as an operation menu and a road map and operates to display the menu screen when the user executes operations to retrieve and set the destination or to retrieve and set a route to the destination while providing a display of route guidance during running of the vehicle.

The speaker 6 serves to help the user with a voice when the user executes various operations of the navigation apparatus 50, while achieving route guidance.

The map information database 2 includes a hard disc drive unit that stores map information provided in graphic display on the display 5.

Map information contains registered point data needed for retrieving road map data, location data for various points and destination and for registering the destination.

Road map data is added with IDs (hereinafter referred to as road IDs) for given intervals on a road. In normal practice, the road added with such IDs is called as a road link. Map information, mentioned above, includes road link data for various road links for road types (highways, national roads, prefectural roads, city roads and farm roads), road attributes (attribute information like an attribute belonging to the National Route 1), link road traffic regulations (road traffic regulations such as one-way traffic roads), link distances (lengths of various road links), node coordinates (latitude and altitude coordinates on origins and terminuses of various road links) and road IDs on adjacent road links connected at the node coordinates.

Road link data further includes information on the number of driving lanes of the various road links.

The radio communication unit 4 includes a narrow-band communication unit, an FM broadcasting receiver or a portable phone that receives traffic information (traffic information delivered from a VICS center) transmitted from a traffic information center at a fixed time interval or receives traffic information on a real time basis based on a request from the navigation apparatus 50.

The camera 11 is located on a vehicle at a front thereof so as to enable road images in front of the vehicle to be picked up for delivering picked-up road images to the while line detector 22 (which is described below) of the CPU 1.

The nonvolatile memory 3 stores received traffic information and sequentially updates traffic information to the latest traffic information. When storing traffic information, reception date and time data is also stored at the same time. Also, received information involves road segments and traffic jam-up information associated with the road segments.

Further, the nonvolatile memory 3 stores jam-up statistical data of the past on respective road segments of highways received from the traffic information center and estimate values on jam-up distances for the day and time zone.

Furthermore, the nonvolatile memory 3 stores a guidance-timing table for selecting a guidance timing at which a drop-off guidance is conducted at an interchange or junction of the highway.

Additionally, the nonvolatile memory 3 stores route information leading to the destination that has been set by the use.

Next, a method of guiding a turnoff road using the navigation apparatus 50, shown in FIG. 1, is described taking a drop-off guidance on a highway as an example.

With the presently filed embodiment, the term "drop-off" refers to movement in that a vehicle heads for an exit leading to a general road at an interchange, forming a gateway of a highway, and the vehicle shifts from a road, on which the vehicle is currently running at a junction serving as a turnoff point of the highway, to a turnoff road.

On such premise, a drop-off guidance is carried out when the vehicle heads for the exit or the turnoff road during running on the highway in the midcourse in which a user heads for the destination.

The current location calculator 21 calculates a current location and a traveling direction of the own vehicle as current location data by permitting information, related to the latitude and altitude coordinates cyclically resulting from the GPS section 7, a vehicle speed and traveling direction acquired from the vehicle speed sensor 8 and the direction sensor 9, and road map data, stored in the map information database 2, to be collated.

The highway approach detector 27 detects the own vehicle approaching the highway based on the current location of the own vehicle and information such as road map data and is controlled to be inoperative when the own vehicle is traveling on the general road.

The white line detector 22 implements edge treatment on a frame image retrieved from the camera 11 at a fixed cycle for thereby extracting white lines by which the driving lane of the own vehicle is specified.

Then, the white line detector 22 serves to set a vehicle center reference line on the frame image, subjected to edge treatment, in a fore and aft direction as a center line in a lateral direction of the own vehicle.

The white line detector 22 outputs a signal (hereinafter referred to as a crossing signal), indicative of a moving direction (right→left or left→right) of the own vehicle, to the driving lane specifying section 23 on a case-by-case basis when detection is made that the white line, extracted at a left side area with respect to the vehicle center reference line on the frame image set forth above, is displaced leftward (or the white line, extracted at the left side area with respect to the vehicle center reference line on the frame image set forth above, is displaced rightward). Also, for the sake of simplification, "a signal", which is outputted when the own vehicle straddles the white line from right to left, is hereunder referred to as "a rightward crossing signal" and "a signal" in an opposite phase is hereunder referred to as "a leftward crossing signal".

The driving lane specifying section 23 specifies the road link, on which the vehicle is currently running, from road link data stored in the map information database 2 based on current location data delivered from the current location calculator 21 and estimates a driving lane for the own vehicle in the specified road link based on the operation signal from the winker switch 12 and the crossing signal from the white line detector 22.

Next, description is made of a general outline of discriminating a lane change executed by the driving lane specifying section 23 when detection is made in a manner set forth above that the own vehicle is located in an approach lane of the highway.

Figure 2:
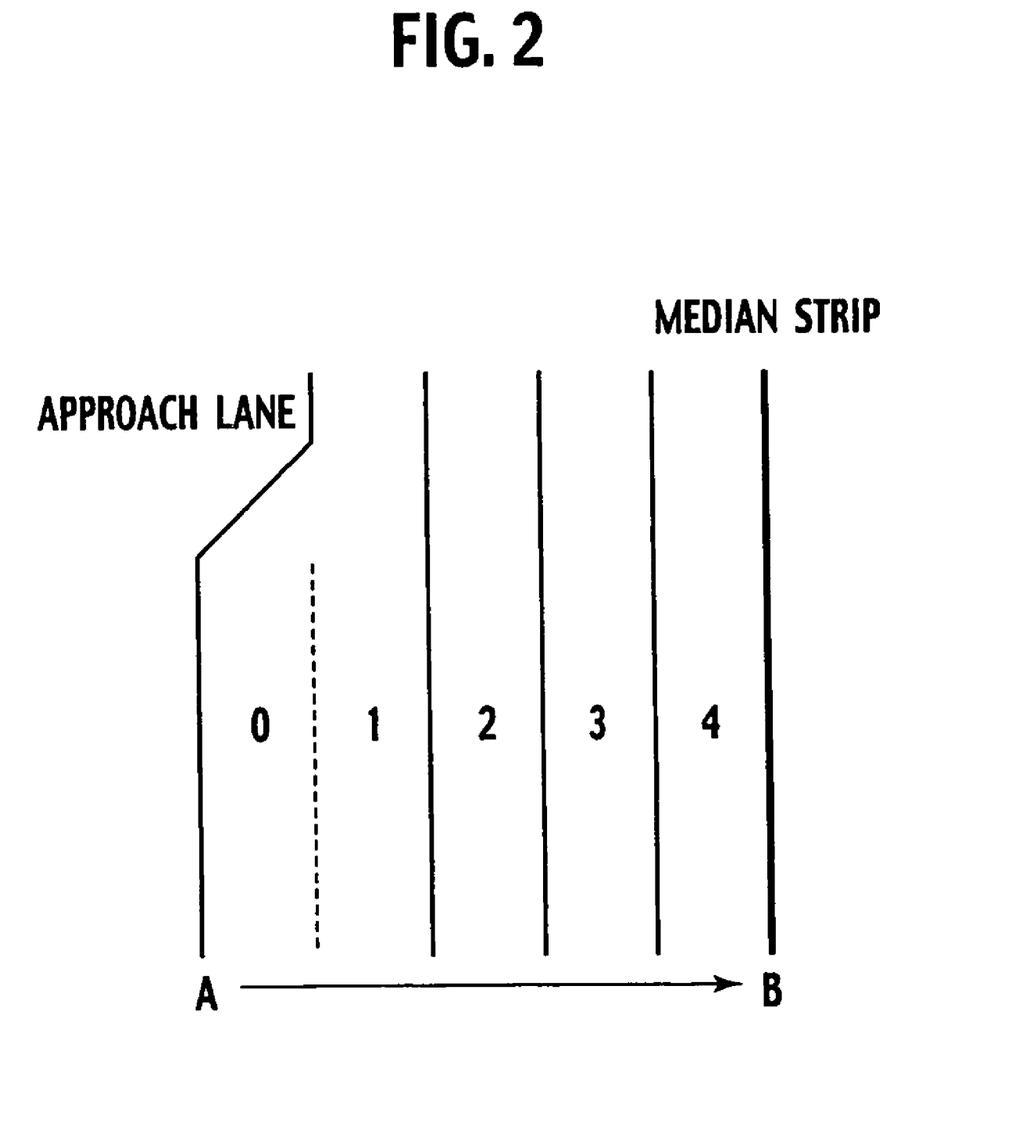
FIG. 2 is a view for illustrating a lane change.

A case, in which the own vehicle enters the leftmost approach lane "0" and the lane change is made in a direction as indicated by an arrow from A to B as shown in FIG. 2, is taken as an example. The driving lane specifying section 23 estimates that the own vehicle moves toward a right direction (direction B) by one lane to enter from the "Approach Lane 0" to a "Lane 1" upon receipt of the right winker turnon operation signal from the winker switch 12 and rightward crossing signal from the white line detector 22.

Then, the driving lane specifying section 23 estimates that the own vehicle moves further toward the right direction (direction B) by another one lane to enter a "Lane 2" when the right winker turnon operation signal is received again or the right winker turnon operation signal is continuously received and when the rightward crossing signal is received from the white line detector 22.

On the contrary, if the left winker turnon operation signal is received and a leftward crossing signal is received from the white line detector 22, the driving lane specifying section 23 estimates that the own vehicle moves leftward (direction A) by one lane.

Also, with the presently filed embodiment, driving lanes 2 to 4 are allocated as passing lanes.

The driving lane specifying section 23 outputs a location of the own vehicle on the relevant driving lane, estimated in such a way, to the guidance-timing controller 24 and the message controller 25.

The guidance timing controller 24 retrieves an interchange of a junction within a forward given distance based on current location data from the current location detector 21 and road information of the map information database 2.

When the objective interchange or junction are retrieved, depending on a location of the driving lane, on which the own vehicle is currently traveling, specified by the driving lane specifying section 23, the latest traffic information stored in the nonvolatile memory 3 and a vehicle speed from the vehicle speed sensor 8, a guidance timing, for commencing a drop-off guidance, is selected from the guidance timing table stored in the nonvolatile memory 3, thereby outputting a control signal to the message controller 25.

Figure 3A:
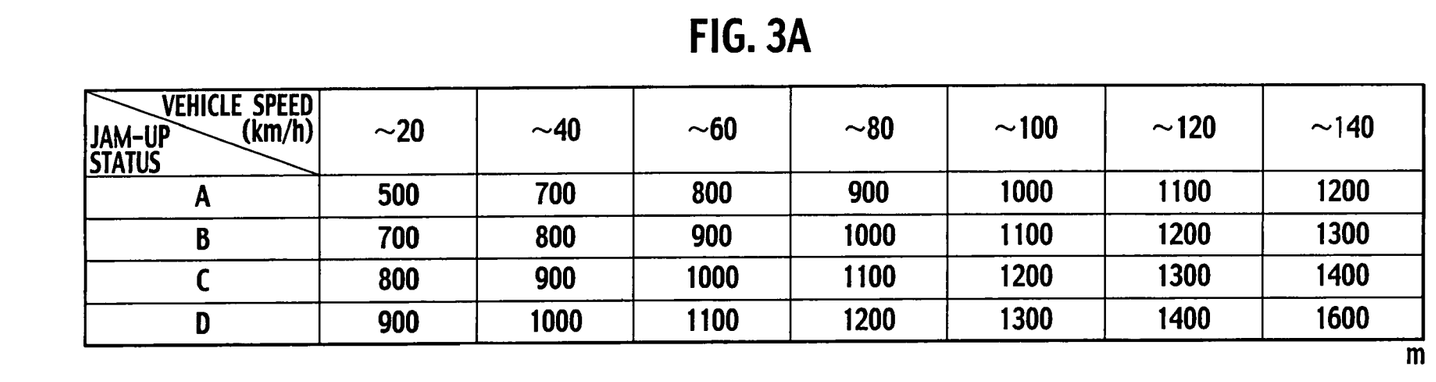
FIGS. 3A and 3B are guidance timing tables for each driving lane shown in FIG. 2 with FIG. 3A showing a table for a driving lane 1 and FIG. 3B showing a table for a driving lane 4.
Figure 3B:
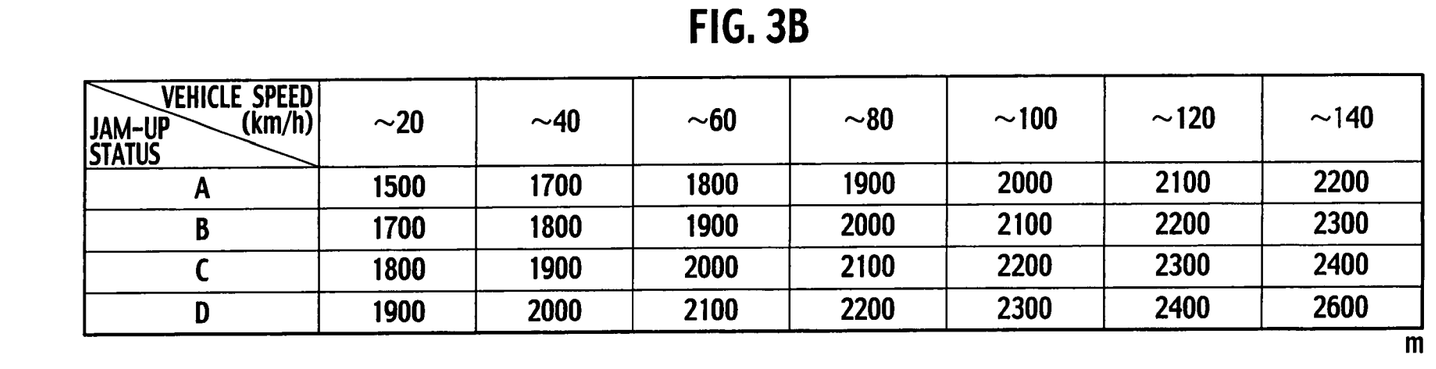

The guidance timing tables are prepared for the driving lanes as shown in FIGS. 3A and 3B. FIG. 3A shows a guidance-timing table for the "Driving Lane 1" in FIG. 2 and FIG. 3B shows a guidance-timing table for the "Driving Lane 4" (Passing Lane) in FIG. 2.

The guidance timing tables provide matrix representations of distances (in "m" terms) from the location (hereinafter referred to as a drop-off position) of the interchange or junction as parameters of the vehicle speed (in "km/h" terms). Here, "A" to "D" in the drawing figure represent jam-up parameters and are allocated such that as a jam-up status is shifted from "A" to "D", the greater will be the degree of the jam-up.

The placement (A to D) of jam-up statuses is preliminarily set depending on a jam-up distance from the drop-off position to a front side. Then, the guidance-timing controller 24 discriminates which of the jam-up statuses is associated with the own vehicle upon receipt of the jam-up distance from traffic information center.

Further, figures in division columns for the vehicle speed exemplarily represents typical numeric values, which are not particularly limited. Here, the representation "~40" means "20 km/h<Vehicle Speed≦40 km/h" and the representation "~100" means "80 km/h<Vehicle Speed≦100 km/h".

Furthermore, it is set such that the higher the vehicle speed or the heavier the jam-up status (the lower in the right areas in FIGS. 3A and 3B), the greater will be the distance (a remaining distance to the drop-off position at the commencement of drop-off guidance) from the drop-off position to a position at which the drop-off guidance is to be initiated, that is, the faster will be the drop-off guidance to be initiated.

With such guidance timing tables, by setting the remaining distance in each driving lane such that as the own vehicle goes farther to the right driving lane from the "Lane 1", the distance is added in 200 m, 300 m and 500 m, thereby taking time needed for the vehicle to move from the "Driving Lane 4" to the "Driving Lane 1" into consideration. That is, the passing lane is set to have an enough margin in the remaining distance to the drop-off position for the lane change to be made.

With the guidance timing selected, the guidance-timing controller 24 delivers the remaining distance, mentioned above, to the message controller 25.

The message controller 25 prepares guidance information depending on the driving lane position, on which the own vehicle is running, in response to a guidance start signal from the guidance timing controller 24.

Resulting guidance information is outputted to the display as image information and converted to a synthesized voice in the guidance voice generator 26 to be outputted from the speaker 6.

The CPU 1 has a function to store destination setting history information, normally owned by the navigation apparatus, registered point information for point information to be preliminarily registered for the use to enable the destination setting at a high frequency, route information for the route retrieved by the user in the nonvolatile memory 3 and a function to execute road guidance in accordance with the route that has been set.

Figure 4:
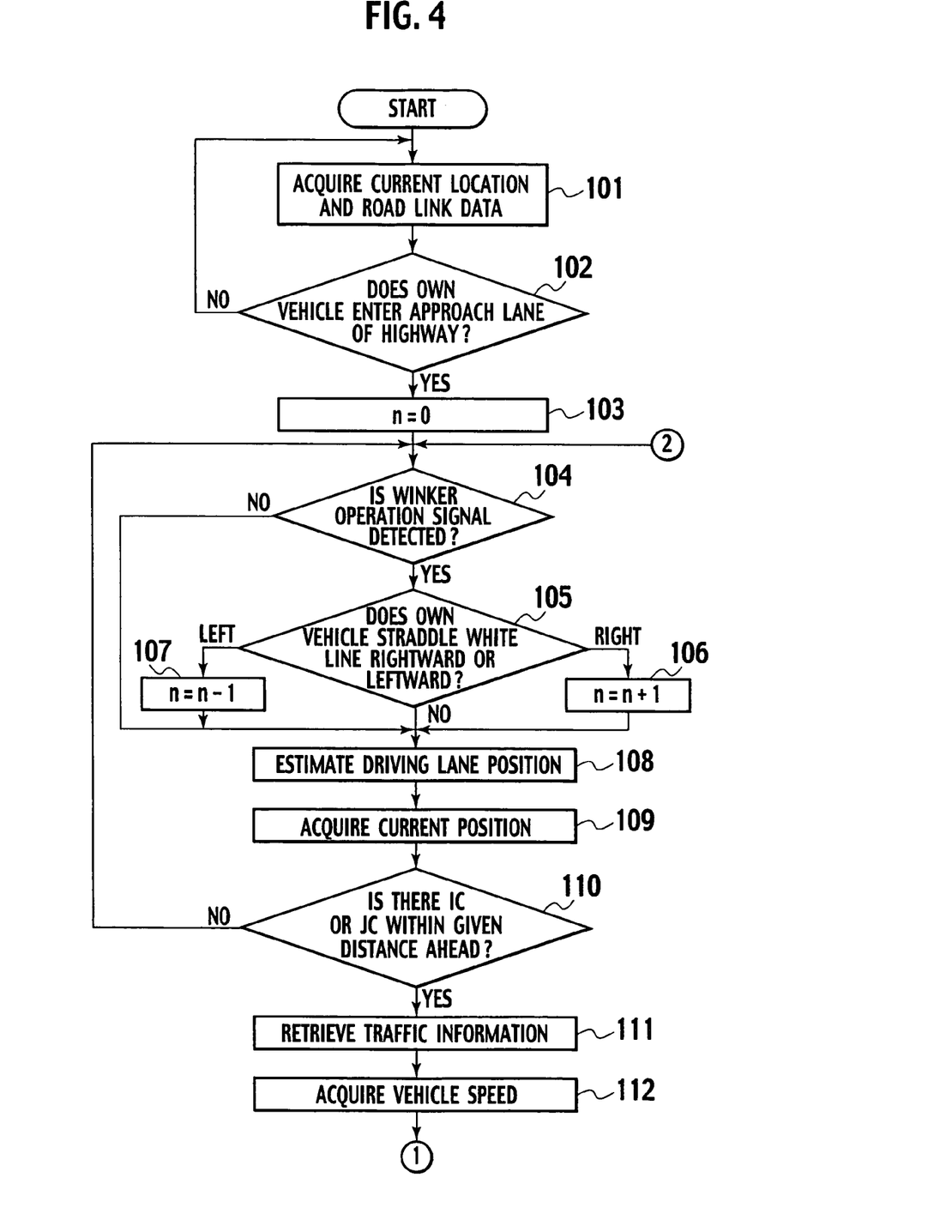
FIG. 4 is a flowchart representing a method of controlling a drop-off guidance to be executed by the on-vehicle navigation apparatus shown in FIG. 1.

Now, a flow of control for achieving a drop-off guidance in the presently filed embodiment is described with reference to the flowchart shown in FIG. 4.

The current location detector 21 acquires signals from the GPS section 7, the vehicle speed sensor 8 and the direction sensor 9 at fixed cycles and calculates a current location. Also, it is supposed that the radio communication unit 4 receives traffic information as needed and the latest traffic information is updated and registered in the nonvolatile memory 3.

In step 101, the driving lane specifying section 23 acquires a current position of an own vehicle from the current location calculator 21 and, depending on the acquired current location, acquires road link data related to a road link, on which the own vehicle is currently running, from the map information database 2.

In step 102, the driving lane specifying section 23 discriminates, based on the acquired current location and road link data, whether or not the own vehicle enters the approach lane of the highway. If the own vehicle enters the approach lane of the highway, the operation goes to step 103 and if not, the operation is routed back to step 101 for repeated operations.

In step 103, the driving lane specifying section 23 sets a value "n" of a value counter, indicative of a position of the driving lane, to be n=0.

In step 104, the driving lane specifying section 23 discriminates whether or not the operation signal from the winker switch 12 is detected. If the operation signal is detected, the operation goes to step 105 and if not, the operation goes to step 108.

In step 105, the white line detector 22 discriminates whether or not the rightward crossing signal or the leftward crossing signal are detected. If the rightward crossing signal is detected, the operation goes to step 106 and the driving lane specifying section 23 increments the value "n" of the value counter (that is, n=n+1) upon which the operation goes to step 108. If the leftward crossing signal is detected, the operation goes to step 107 and the driving lane specifying section 23 decrements the value "n" of the value counter (that is, n=n−1) upon which the operation goes to step 108. If none of the leftward and rightward crossing signals is detected, the operation goes intact to step 108.

In step 108, the driving lane specifying section 23 estimates the position of the driving lane of the own vehicle based on the value of the value counter counted in step 104 to step 107.

In step 109, the driving lane specifying section 23 and the guidance-timing controller 24 acquire the current location of the own vehicle from the current location calculator 21.

In step 110, the guidance timing controller 24 retrieves route information of the nonvolatile memory 3 for a given distance ahead of the own vehicle in the traveling direction from the current location of the own vehicle to check whether the interchange (IC) or junction (JC) are involved. If the interchange (IC) or junction (JC) are not present within a given distance, the operation is routed back to step 104 for repeated operations of estimating the location of the driving lane. If the interchange (IC) or junction (JC) are present, the operation goes to step 111.

Figure 5:
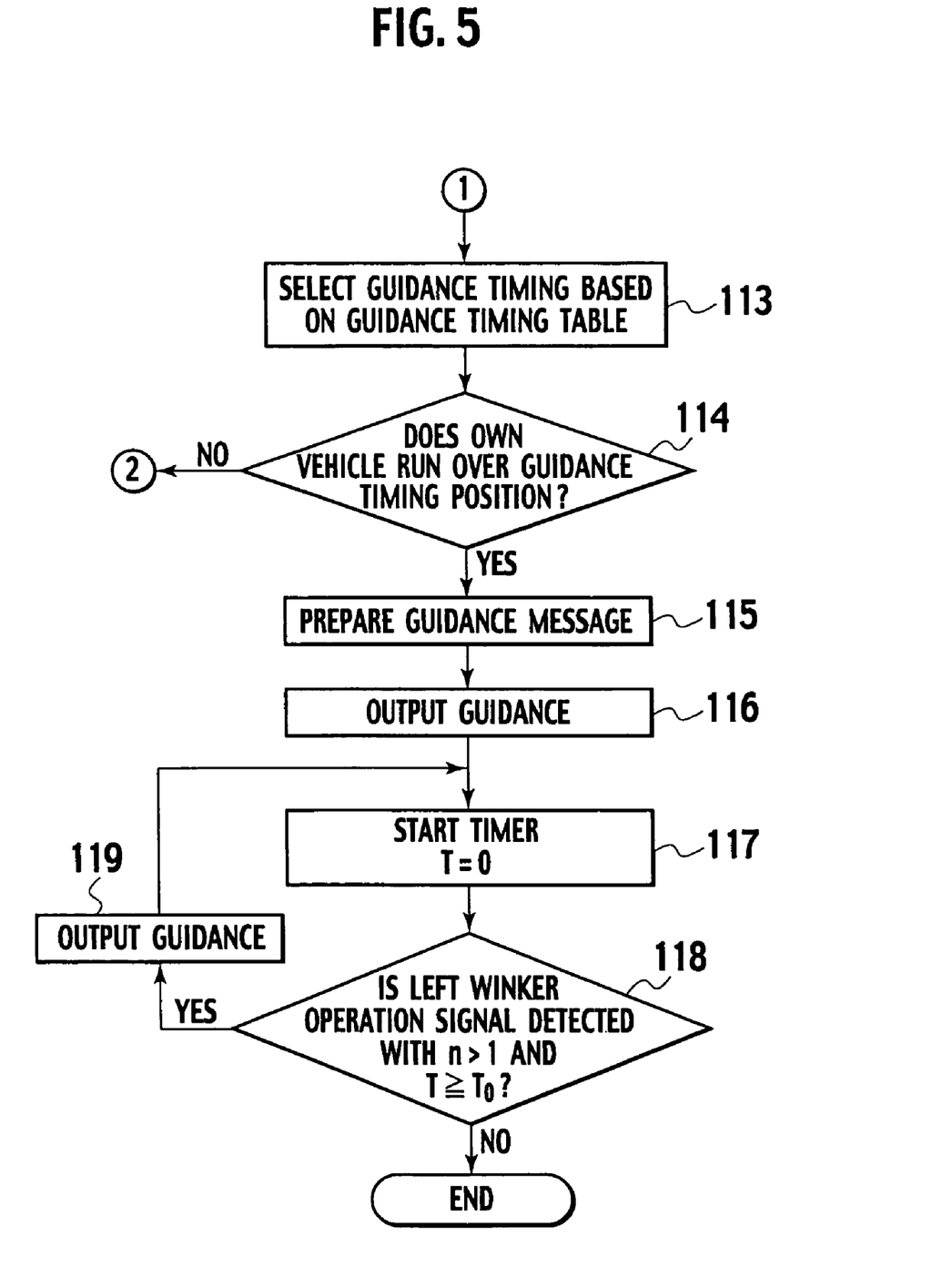
FIG. 5 is a flowchart of operations contiguous to the operations shown in FIG. 4.

In step 111, the guidance-timing controller 24 acquires the latest traffic information in the vicinity of the detected interchange or junction. Also, if jam-up information on traffic information is indicated in a jam-up distance, the operation is executed to read out the jam-up distance from the interchange or junction in a direction, on which the own vehicle is currently located, for thereby discriminating which of the "jam-up statuses A, B, C, D" shown in FIG. 3 is to be responded.

In step 112, the guidance-timing controller 24 acquires the vehicle speed of the own vehicle.

In step 113, the guidance timing controller 24 retrieves the guidance timing table, associated with the position (that is the value "n" of the value counter) of the driving lane of the own vehicle, from the nonvolatile memory 3 for selecting a remaining distance from the drop-off position to a position, at which the guidance timing is initiated, depending on the current vehicle speed and the jam-up status of traffic information.

However, if a distance resulting from the jam-up distance, added with a given allowance distance, exceeds the remaining distance mentioned above, the distance resulting from the jam-up distance, added with the given allowance distance, is employed in place of the remaining distance set forth above. Also, the given allowance distance is treated as a function of the position of the driving lane of the own vehicle and the vehicle speed and preferably set such that the closer the driving lane to the rightward lane than the "Driving Lane 1" and the higher the vehicle speed, the greater will be the allowance distance.

In step 114, the guidance timing controller 24 checks whether or not the own vehicle runs over the guidance timing position, at which the selected guidance timing is initiated, based on the current location acquired from the current location calculator 21. If the own vehicle runs over the guidance timing position, the operation goes to step 115 and if not, the operation is routed back to step 104 for repeated operations to estimate the driving lane position.

In step 115, the message controller 25 acquires the remaining distance from the drop-off position to the position, at which the drop-off guidance is commenced, from the guidance timing controller 24 and if the own vehicle is running on the "Driving Lane 1" under the "Jam-up Status B" at a speed of approximately 80 km/h, generates a message like "Junction 1000M Ahead, Soon". If the own vehicle is running on the "Driving Lane 2" under the "Jam-up Status B" at a speed of approximately 80 km/h, the message controller 25 additionally generates, subsequently to a message like "Junction 1200M Ahead, Soon", a message like "Change Lane with Allowance, Please".

In step 116, the message controller 25 allows the display 5 to provide a display of the message in character information and the guidance voice generator 26 generates a synthesized voice to cause the speaker 6 to provide a guidance output with the voice.

In step S117, the message controller 25 starts the timer (t=0).

In step 118, the message controller 25 checks, based on the lane position delivered from the driving lane specifying section 23, whether or not the left winker turnon signal from the winker switch 12 is detected within given time of $T_o$ second when the own vehicle is located in the passing lane (n>1). If no left winker turn signal is detected, the operation goes to step 119, in which the message controller 25 outputs the message with the voice again, and the operation is routed back to step 117 in which the operation is continuously execute to repeatedly control the outputting of the messages.

In contrast, if the left winker turnon signal from the winker switch 12 is detected within given time of $T_o$ second, the drop-off guidance is terminated. Also, after step 116, if the own vehicle is already located in the "Driving Lane 1" in step 118 or if the left winker turnon signal outputted within given time of $T_o$ second is detected, no operation is executed to provide repeated notifications for the drop-off guidance.

With the flowchart of the presently filed embodiment, step 102 represents a function of a highway approach detector section, steps 104 to 108 a function of a driving lane specifying section, and step 110 a function of a drop-off position detector section. Specifically, step 105 of the flowchart represents a function of a white line detector.

In the foregoing, the on-vehicle navigation apparatus according to the present invention and the turnoff road guiding method using such an apparatus have been described taking the vehicle running on the highway as the example.

As will be apparent from the foregoing description, according to the present invention, since the driving lane (or lane change) of the own vehicle is detected based on the operation signal from the winker switch 12 and the crossing signal (rightward crossing signal and leftward crossing signal) generated from the white line detector 22, merely achieving the positioning through the normal GPS enables the position of the driving lane in the highway to be accurately estimated.

In cases where the own vehicle is located in the passing lane, the guidance timing is selected in such a way to provide the user with a turnoff road guidance in an early stage depending on circumstances with an enough distance in front of a turnoff point, it becomes possible for the user to make a lane change with an allowance. This provides the user with a further favorable effect particularly under circumstances where the own vehicle is approaching forward to the interchange or junction ahead in the traveling direction during traveling on the highway.

Further, for a distance from a turnoff point to a position at which the turnoff road guidance is initiated, since the guidance timing is selected depending on a jam-up status of traffic information in the vicinity of the turnoff point such that the severer the jam-up status or the higher the vehicle speed, the far will be the distance from the turnoff point at which the turnoff road guidance is initiated, the user can be provided with the turnoff road guidance in an early stage depending on the circumstances to enable the lane change with an allowance.

Furthermore, if the own vehicle is running on the passing lane (n>1), the content of the message for the turnoff road guidance is altered to a content different from that of the case under which the own vehicle is running on the "Driving Lane 1" (n>1) with an additional message to urge the driver to make a lane change in an early stage, thereby enabling the driver to call attention.

Moreover, under circumstances where the own vehicle is running on the passing lane (n>1), if no operation signal from the winker switch 12 is detected after the message for the turnoff road guidance has been provided, the operation is executed to provide drop-off guidance again and, therefore, even if the driver misses the message once, the message urging the driver to make lane change is repeatedly executed, thereby drawing the user's attention to the message.

In cases where in step 111 of the flowchart for the drop-off (turnoff road) guidance, the guidance timing controller 24 is unable to acquire the latest traffic information in the vicinity of the detected interchange or junction, an alternative may be structured such that statistical jam-up information in the past corresponding to the relevant point stored in the nonvolatile memory 3 is acquired for use in selecting the guidance timing.

In cases where in step 110 of the flowchart for the drop-off (turnoff road) guidance, the guidance timing controller 24 retrieves road information from the map information database 2 for the given distance from the current location to a position ahead of the own vehicle in the traveling direction to check whether or not the interchange or junction are present. In this moment, an alternative may be such that if no interchange or junction is present within the given distance, the operation is routed back to step 104 to repeatedly estimate the position of the driving lane and if there is the interchange or junction within the given distance, the operation goes to step 111. In this case, it is supposed that the flowchart does not include steps 117, 118, 119.

With such arrangements, under a condition wherein no route guidance is set, the drop-off (at the turnoff road) guidance can be provided for each interchange or junction at an appropriate timing and even in a case where no route guiding function is used, it becomes possible to call the driver's attention for an exit indication being missed or to prevent a delay in lane change caused under the jam-up status.

Besides, while the presently filed embodiment has been described with reference to an example wherein the driving lane (change lane) of the own vehicle is detected using the operation signal from the winker switch 12 and the crossing signal (rightward crossing signal and the leftward crossing signal) of the white line detector 22, the present invention is not limited to such an example. An alternative may be configured such that the value "n" of the value counter is incremented for each detection of the right winker turnon operation signal or the value "n" of the value counter is decremented for each detection of the left winker turnon operation signal upon which the position of the driving lane is estimated at the value "n" of the value counter.

The entire content of Japanese Patent Applications: No. P2004-168422 with a filing data of Jun. 7, 2004; and No. P2005-124615, Apr. 22, 2005 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An on-vehicle navigation apparatus comprising:
   a current location calculator calculating a current location of an own vehicle;
   a map information database storing map information including road map data;
   a driving lane specifying section detecting a lane change in response to an operation signal from a winker and specifying a driving lane on which the own vehicle is traveling; and
   a guidance timing controller detecting a turnoff road ahead of the own vehicle in a traveling direction based on the current location of the own vehicle and the road map data, and conducting a turnoff road guidance at a forward position which is between the detected turnoff road and the own vehicle; and
   a guidance table determining the forward position for a location of the specified driving lane of the own vehicle, based on a combination of a jam-up status at the turnoff road, and a speed of the own vehicle.

2. The on-vehicle navigation apparatus according to claim 1, further comprising:
   a highway approach detector detecting an approach of the own vehicle toward a highway based on the current location of the own vehicle and the road map data, and sending a signal to the driving lane specifying section indicating that the own vehicle is approaching toward the highway.

3. The on-vehicle navigation apparatus according to claim 1, wherein:
   the driving lane specifying section includes a white line detector detecting a white line in a forward area of a road; and
   the white line detector detects the operation signal from the winker and subsequently discriminates the lane change in response to a crossing signal indicative of whether the own vehicle straddles a white line rightward or leftward for thereby specifying the location of the driving lane on which the own vehicle is currently traveling.

4. The on-vehicle navigation apparatus according to claim 1, further comprising:
   a radio communication unit receiving traffic information including the jam-up status at the turnoff road.

5. The on-vehicle navigation apparatus according to claim 1, wherein:
   the turnoff road guidance provides a message with a content that is different depending on the position of the specified driving lane of the own vehicle.

6. The on-vehicle navigation apparatus according to claim 1, wherein:
   in cases where after the turnoff road guidance has been conducted at the forward position, the operation signal from the winker is not detected, the turnoff road guidance is repeatedly conducted.

7. A turnoff road guiding method comprising:
   calculating a current location of an own vehicle;
   detecting a lane change in response to an operation signal from a winker and specifying a driving lane on which the own vehicle is traveling;
   detecting a turnoff road ahead of the own vehicle in a traveling direction based on the current location of the own vehicle and a road map data;
   determining a forward position, which is between the detected turnoff road and the own vehicle, for a location of the specified driving lane of the own vehicle, based on a combination of a jam-up status at the turnoff road, and a speed of the own vehicle; and
   conducting a turnoff road guidance on a driver at the forward position.

8. The turnoff road guiding method according to the claim 7, further comprising:
   discriminating a lane change in response to a crossing signal indicative of whether an own vehicle straddles a white line rightward or leftward.

9. An on-vehicle navigation apparatus comprising:
   a current location calculation means calculating a current location of an own vehicle;
   a map information storage means storing map information including road map data;
   a driving lane specifying means detecting a lane change in response to an operation signal from a winker and specifying a driving lane on which the own vehicle is traveling; and
   guidance timing control means detecting a turnoff road ahead of the own vehicle in a traveling direction based on the current location of the own vehicle and the road map data, and conducting a turnoff road guidance at a forward position which is between the detected turnoff road and the own vehicle; and
   a guidance table determining the forward position for a location of the specified driving lane of the own vehicle, based on a jam-up status at the turnoff road, and a speed of the own vehicle.

* * * * *